United States Patent [19]
Haas, Sr. et al.

[11] Patent Number: 5,103,717
[45] Date of Patent: Apr. 14, 1992

[54] BAKING TONGS FOR PRODUCING EDIBLE WAFERS FROM WAFER DOUGH IN A WAFER BAKING OVEN OR AN AUTOMATIC WAFER BAKING MACHINE

[75] Inventors: Franz Haas, Sr., Vienna; Franz Haas, Jr., Leobendorf; Johann Haas, Klosterneuburg, all of Austria

[73] Assignee: Franz Haas Waffelmaschinen Industriegesellschaft m.b.H., Vienna, Austria

[21] Appl. No.: 189,287

[22] Filed: May 2, 1988

[30] Foreign Application Priority Data

May 7, 1987 [AT] Austria ............... A1157/87

[51] Int. Cl.⁵ .............................. A47J 37/01
[52] U.S. Cl. ...................... 99/353; 99/372; 99/373; 99/374; 99/380; 99/427; 249/166; 249/168; 292/256.75; 425/451.9; 425/595
[58] Field of Search ........ 99/353, 359, 372, 379, 99/380, 352, 374, 373, 381, 384, 426, 427, 428, 439, 443 C; 292/210, 256, 75, 304; 49/324; 425/451.5, 451.9, 450.1, 595, DIG. 221; 249/166, 168; 164/341

[56] References Cited

U.S. PATENT DOCUMENTS

| | | | |
|---|---|---|---|
| 721,455 | 2/1903 | Mackenzie | 99/372 |
| 990,577 | 4/1911 | Mayle et al. | 99/373 |
| 1,697,487 | 1/1929 | Wright | 292/256.75 X |
| 1,757,983 | 5/1930 | Tugendhat | 99/373 |
| 1,915,211 | 6/1933 | Balton | 99/373 |
| 2,168,006 | 8/1939 | Strietelmeier | 99/439 |
| 2,520,997 | 9/1950 | Cavanagh | 99/372 |
| 2,720,157 | 10/1955 | Harrison | 99/353 X |
| 2,770,858 | 11/1956 | Anderson | 164/341 |
| 2,984,176 | 5/1961 | Sommer et al. | 164/341 X |
| 3,199,159 | 8/1965 | Wernecke | 164/341 |
| 3,468,577 | 9/1969 | Winston | 292/256.75 |
| 3,666,134 | 5/1972 | Rauch | 292/256.75 X |
| 3,768,952 | 10/1973 | Connolly | 425/451.9 X |
| 4,005,967 | 2/1977 | Ayres et al. | 425/451.9 X |
| 4,059,383 | 11/1977 | Tsutsumi | 425/451.9 X |
| 4,174,939 | 11/1979 | Fenner | 425/451.9 |
| 4,364,720 | 12/1982 | Ryder | 425/451.9 X |
| 4,372,738 | 2/1983 | Black et al. | 249/166 X |
| 4,594,067 | 6/1986 | Langos | 425/451.9 |
| 4,643,663 | 2/1987 | Bowles | 425/451.9 X |
| 4,648,314 | 3/1987 | Plicht et al. | 99/374 X |
| 4,741,380 | 5/1988 | Landua | 164/341 |

FOREIGN PATENT DOCUMENTS

| | | |
|---|---|---|
| 599745 | 6/1934 | Fed. Rep. of Germany . |
| 256837 | 5/1988 | Fed. Rep. of Germany ...... 164/341 |
| 3387 | of 1883 | United Kingdom ................. 99/372 |

Primary Examiner—Harvey C. Hornsby
Assistant Examiner—Mark Spisich
Attorney, Agent, or Firm—Collard, Roe & Calgano

[57] ABSTRACT

Baking tongs for producing edible wafers from wafer dough in a wafer baking oven or an automatic wafer baking machine consist of a wafer baking mold comprising baking mold parts in respective tong parts which are moved toward each other and away from each other in order to open and close the wafer baking mold. For a rigid interlocking of the two tong parts when the wafer baking mold is closed, the tong parts are provided with cooperating closure sections. The closure section of one tong part is provided with a rigid locking pin, which protrudes from the inside surface of that closure section. The closure section of the other tong part is formed with a through opening, which constitutes a passage for the locking pin, and is provided with a hook which is engageable with the locking pin. The hook is pivoted on the outside of the closure section and has an engaging surface for engaging an engaging surface of the locking pin. The hook is provided with an actuating element for pivotally moving the hook.

31 Claims, 1 Drawing Sheet

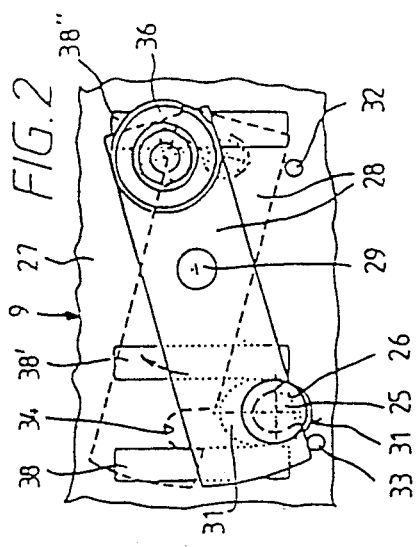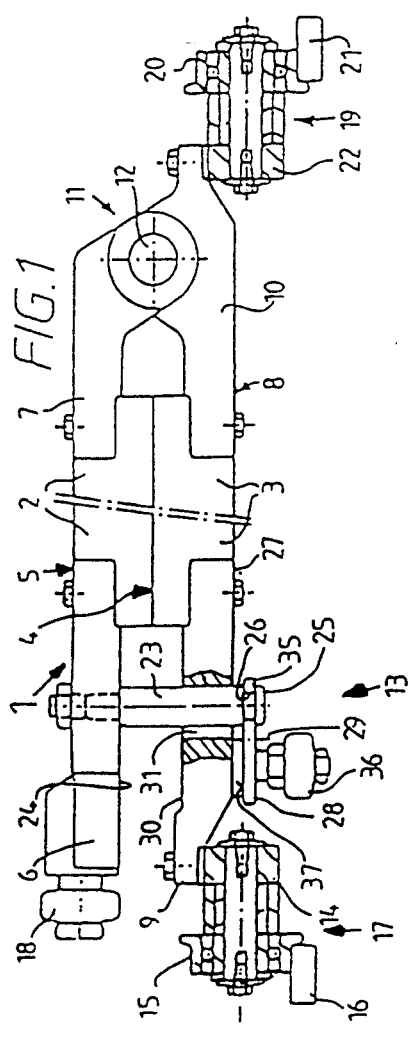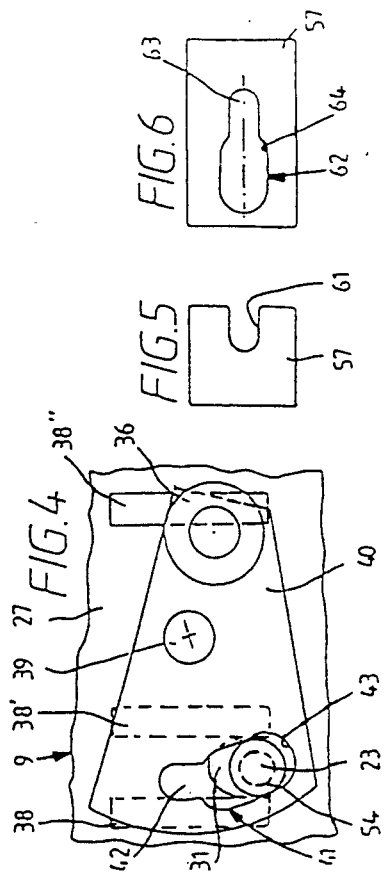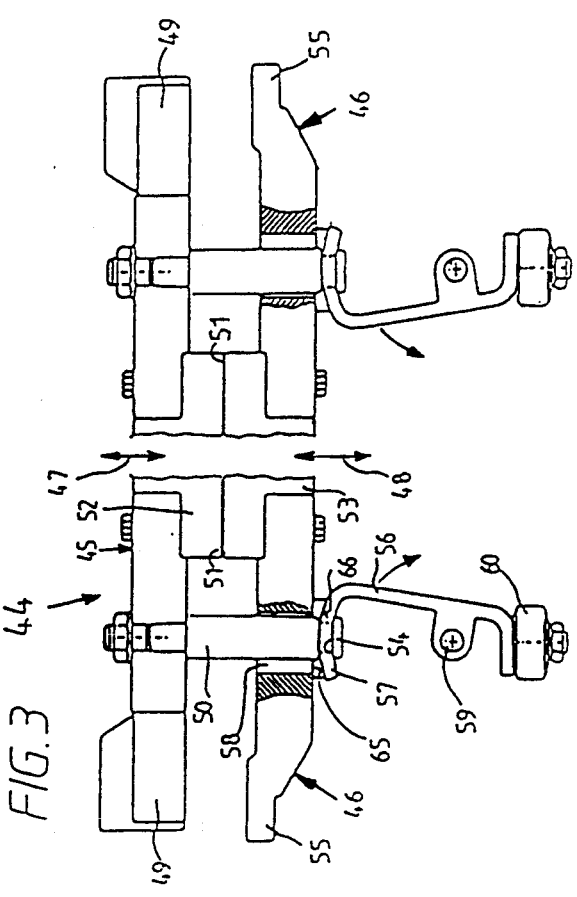

BAKING TONGS FOR PRODUCING EDIBLE WAFERS FROM WAFER DOUGH IN A WAFER BAKING OVEN OR AN AUTOMATIC WAFER BAKING MACHINE

BACKGROUND OF THE INVENTION

1. Field of the Invention

This invention relates in general to the production of edible wafers from wafer dough, which in most cases is liquid and is introduced into the wafer baking molds of wafer baking tongs and is baked to form the wafers in a wafer baking oven or an automatic wafer baking machine. More specifically, the invention relates to wafer baking tongs which consist of two tong parts, which are provided with the baking mold parts of the wafer baking tongs. Said baking mold parts have confronting baking surfaces, which define the three-dimensional shape of the baked wafers. Said baking mold parts may be integrally formed with the respective tong parts. To permit the wafer baking tongs to be opened and closed the two tong parts of a pair of wafer baking tongs are designed to be pivotally movable toward and away from each other about a common axis or to be linearly movable toward and away from each other.

2. Description of the Prior Art

In the wafer-making industry, wafer baking tongs are used in wafer baking machines or automatic wafer baking machines for a mechanical production of individual wafers or wafer products having a predetermined three-dimensional shape in large quantities. As a rule, a wafer baking machine comprises 24 to 80 identically designed pairs of baking tongs, which are arranged in a row and interconnected to form a chain of pairs of baking tongs and revolve through an oven-chamber from a dough feeding station to a wafer product discharge station. Modern wafer baking ovens or automatic wafer baking machines have been described, e.g., in U.S. Pat. Nos. 4,417,508; 4,438,685; and 4,648,314.

Just as in a confectionary, a distinction is made in the wafer industry between crisp, brittle, fragile wafer products, which in the final product have a moisture content not in excess of 1 to 4%, and soft, elastic wafers, which in the final product contain moisture in excess of 8%.

Examples of crisp, brittle wafer products baked in wafer baking ovens or wafer baking machines consist of cast wafer cones, large rectangular wafer sheets, low hollow wafers, wafer cups, wafer plates, and cast wafer figures. Such products are usually baked from a liquid dough or from a wafer dough which contains no sugar or has only a low sugar content.

Another known crisp, brittle wafer products made in wafer baking ovens or wafers baking machines is the rolled wafer cone, which is also known as an ice cone or sugar cone and is made in that a wafer sheet or flat wafer cake is baked from a liquid wafer dough having a high sugar content and is rolled up to form a cone while the wafer is still in a warm, plastically deformable state.

An example of soft elastic wafers is constituted by the so-called Belgian wafers, which are baked from a wafer dough which contains a raising agent and 20 to 50% egg material.

The wafer products mentioned hereinbefore are produced with the aid of wafer baking molds, in which a single piece of wafer product or a plurality of wafer product pieces, depending on the nature of the wafer product, are baked at a time. For instance, large crisp, rectangular wafer sheets are individually baked in wafer baking molds which comprise two baking plates each. On the other hand, crisp wafer cones are baked in sets of, e.g., six cones in a single wafer baking mold.

In known wafer baking tongs for making wafers or wafer products, such as flat wafers or low hollow wafers or the like, the baking surfaces are formed on the inside surfaces of two flat baking plates, which are laterally provided with ledges, which laterally seal the cavity defined by the wafer baking mold when it is closed. When that wafer baking mold is closed, the single parting plane thereof is disposed between and parallel to the two baking plates, which have confronting baking surfaces and are received or integrated in two tong parts, which are connected by hinge means on one side and can be pivoted between closed and open positions and on that side which is opposite to the hinge means are provided each with a closure section for rigidly interlocking the tong parts when they have been pivoted to a closed position so as to close the wafer baking mold.

If the wafer baking mold is separated from the baking tongs, the two tong parts of the baking tongs constitute carrying frames which can be pivotally collapsed and unfolded and in which the closure sections and the hinge means of the baking tongs are integrated and which take up the pressure forces which during the baking process act on those baking mold parts which are received by the tong parts and consist, e.g., of the two baking plates.

If the wafer baking mold is integrated in the baking tongs, the parts of the baking mold, e.g., the two baking plates, constitute self-supporting parts of the baking tongs and particularly of the two tong parts and in that case the hinge means of the baking tongs and the closure sections of the baking tongs are formed on components which are laterally attached to the baking plates.

For use in the production of hollow wafers, such as cast crisp wafer cones or wafers figures or the like, the wafer baking mold that is received in two parts consists of a punch that is received in one tong part and a die, which is formed with molding recesses and is separated from the punch along a parting plane and consists of two die halves, which are separated along a second parting plane that is separate from the first, and the mold also comprises an opening and closing mechanism and is received in its entirety in the other tong part.

In known wafer baking tongs each of such wafer baking molds consisting of a punch and die is received in two tong parts, which are adapted to be pivotally collapsed and unfolded and are connected on one side by hinge means, and each of said tong parts is provided on that side which is opposite to the hinge means with a closure section for rigidly interlocking the tong parts when they have been collapsed to close the wafer baking mold.

Other known wafer baking tongs comprise two of such wafer baking molds, each of which consists of a punch and die and is received in two tongs parts, which are adapted to be moved toward and away from each other and are movable along track rods and are provided on each of two mutually opposite sides with two closure sections, which constitute pairs of mutually opposite closure sections for rigidly interlocking the two tong parts when they have been collapsed to close the two wafer-baking molds.

In the known wafer baking tongs the closure sections provided on the tong parts and cooperating to rigidly interlock the two tong parts have different shapes. The two closure sections togeter constitute the closure of the baking tongs and said closure is actuated when the baking tongs are closed at the beginning of the baking time and when the baking tongs are opened at the end of the baking time. If the baking time amounts to 1.5 minutes and the wafer baking machine is operated for 14 hours per day, the closure will be actuated 1120 times a day.

Known wafer baking tongs comprise a rotatable locking mandrel in the closure section of one tong part and a rigid locking plate on the closure section of the other tong part. The locking mandrel is rotatably mounted in the closure section of the lower tong part and is substantially at right angles to the parting plane of the baking mold and at its end portion upwardly protruding from the inside surface of the closure sections carries a hammer head, and a rotary star wheel is non-rotatably secured to the downwardly protruding end portion of said mandrel. The locking plate is provided with a slot, through which the hammer head of the locking mandrel is adapted to move. The locking plate is secured to two spaced apart extensions, which protrude from the closure section of the upper tong part and leave a sufficiently large gap between them for a rotation of the hammer head. When it is desired to interlock the two tong parts after the hammer head of the locking mandrel has moved through the slot in the locking plate, the locking mandrel is rotated until the underside of the hammer head rests on the upper surface of the locking plate. When the locking plate has been worn in operation, that wear is compensated by a replacement of a washer, which is disposed between the inside surface of the closure section and a collar of the locking mandrel. That washer is machined to have the height that is required in a given case.

Other known wafer baking tongs comprise carrying frames and baking plates received in said frames and the closure section of the upper part of said tongs protrudes from that tong part substantially at right angles thereto toward the parting plane of the baking mold and contains a cylindrical bore, which is parallel to the parting plane and in the closed baking tongs is aligned with a cylindrical pin, which is mounted in the closure section of the lower tong part, which closure section protrudes substantially at right angles to the parting plane, and said locking pin is mounted in said closure section for a displacement that is parallel to the parting plane. When the two tong parts are to be interlocked, the pin is pushed into the bore.

In further known baking tongs a hook is pivoted to one tong part on an axis that is parallel to the parting plane and said hook is movable from the outside in a lateral direction into the closure section of the other tong part.

In all said known closures the wear which takes place in operation in the bearing means for the movable locking elements will result in a larger bearing clearance so that the baked wafers increase in thickness.

SUMMARY OF THE INVENTION

The present invention provides wafer-baking tongs which are used to produce edible, wafers from wafer dough and consist of a) a wafer baking mold which defines at least one parting plane and comprises baking mold parts which are disposed on opposite sides of said at least one parting plane and have confronting inside surfaces formed with baking surfaces for defining the three-dimensional shape of the baked wafer, b) two tong parts, which are provided with the baking mold parts of the wafer baking mold and are movable away from and toward each other to open and close the wafer baking mold, wherein the two tong parts comprise cooperating closure sections for rigidly interlocking the two tong parts when they have been moved toward each other to close the wafer baking mold, wherein i) a locking pin is rigidly secured to the closure section of one tong part and protrudes from the inside surface of said closure section substantially at right angles to the parting plane of the wafer baking mole, ii) the closure section of the other tong part is formed with a through opening, which extends from the inside surface to the outside surface of said closure section and constitutes a passage for said locking pin, and a hook provided with at least one actuating element is disposed on the outside surface of the closure section of said other tong part and is pivotally movable between a locking position for engaging the locking pin and a release position, and iii) engaging surface are provided on said hook and on the outside surface of the closure section of said other tong part and are associated with each other and engageable with each other when said hook is in said locking position.

Within the scope of the invention the tongs may be so designed that the two tong parts are connected by hinge means on one side and each of said tong parts is provided on that side which is opposite to said hinge means with one of said closure sections for rigidly interlocking the two tong parts when they have been collapsed to close the wafer baking mold.

Also within the scope of the invention the tongs may be so designed that each of the two tong parts is provided on two mutually opposite sides with closure sections which cooperate with closure sections of the other tong part and serve to rigidly interlock the two tong parts when they have been collapsed to close the wafer baking mold.

Owing to the design in accordance with the invention the two tong parts, the two baking mold parts and the baking surfaces of said mold parts will precisely assume a predetermined position relative to each other for a long time so that a constant thickness of the baked wafers will be ensured, and that position will not be influenced by the clearance which is required for the movement of the hook or by any wear of the bearing means for said hook. When the hook in its position interlocks with the rigid locking pin, the engaging surface of the hook will snugly contact the engaging surface provided on the outside surface of the closure section so that there will be no backlash of the hook.

In accordance with a further feature of the invention the pivotal axis of the hook is at right angles to the parting plane of the wafer baking mold. That feature will permit a simple and space-saving arrangement of the hook. Such an arrangement will be particularly desirable in baking tongs comprising integrated baking plates and having a small overall height.

In accordance with a further feature of the invention the hook consists of a flat plate, which is formed with an opening for receiving the locking pin, and the locking pin is formed on its free end portion with a rearwardly facing engaging surface for engaging that portion of the rear surface of the flat plate which surrounds the narrow portion of the opening. Owing to that design the two engaging surfaces of the hook and of the closure section, respectively, can be formed in a simple manner as plane surfaces which are parallel to the parting plane of the wafer baking mold.

In accordance with a further feature of the invention the hook consists of a flat plate, which is formed with a keyholelike opening, the narrower portion of said opening constitutes a laterally open aperture for receiving the locking pin, and the locking pin is formed on its free end portion with a rearwardly facing engaging surface for engaging that portion of the rear surface of the flat plate which surrounds the narrow portion of the opening. Larger engaging surfaces can be provided because the hook consists of a pivoted flat locking plate having a keyholelike opening.

In an arrangement within the scope of the invention. The pivotal axis of the hook is parallel to the parting plane of the wafer baking mold. In wafer baking tongs having a relatively large overall height because they comprise carrying frames for the parts of the baking mold, that design will permit the use of a shorter locking pin because it is sufficient for that pin to extend as far as to the outside surface of the closure section whereas the actuating element of the hook may protrude beyond the outside surface of the hook may protrude beyond the outside surface of the tong part.

In accordance with a further feature of the invention the hook is provided on its laterally extending hook end portion with a preferably flat engaging surface, which faces away from the outside surface of the closure section, and the locking pin is provided on its free end portion with a hook-receiving opening that is formed with a rearwardly facing and preferably flat engaging surface for engaging the engaging surface of the hook.

A further feature of the invention resides in that the hook consists of a two-armed lever, one arm of which is engageable with the locking pin whereas the other arm of said lever carries the actuating element, which preferably consists of a roller.

Finally, it is possible within the scope of the invention to provide an arrangement in which the inside width of the laterally open aperture is smaller than the outside diameter of the cylindrical locking pin, which is formed with a radial groove, the pin diameter at the bottom of said groove is equal to the inside width of the aperture and the profile of the groove is similar to the profile of the edge of the aperture.

BRIEF DESCRIPTION OF THE DRAWING

FIG. 1 is a diagrammatic elevation showing wafer baking tongs which comprises two pivotally collapsible and unfoldable tong parts and self-supporting baking plates, which are integrated in said tong parts.

FIG. 2 is a bottom view showing the closure of the baking tongs of FIG. 1.

FIG. 3 is an elevation showing a closure region of another pair of interlocked wafer baking tongs with two mutually opposite closure regions which are mirror images of each other.

FIG. 4 is like FIG. 2 a bottom view and shows the closure region of the baking tongs of FIG. 1 with a different pivoted locking member.

FIGS. 5 and 6 are top plan views showing two different embodiments of the laterally bent hook end portion of the pivoted hook shown in FIG. 3.

DETAILED DESCRIPTION OF THE PREFERRED EMBODIMENTS

Illustrative embodiments of the invention will be explained more in detail hereinafter with reference to the drawing, in which like parts are designated with the same reference characters.

A first embodiment of the wafer baking tongs 1 in accordance with the invention is shown in FIG. 1 and comprises integrated, self-supporting baking mold parts 2 and 3, which consist of flat baking plates and on their confronting inside surfaces carry the baking surfaces, not shown, of a wafer baking mold 2, 3, which defines a parting plane 4 and is adapted to be opened and closed by movements relative to said parting plane. The baking tongs 1 consist of two tong parts, which are interconnected by hinge means. The upper tong part 5, which is shown at the top in FIG. 1, comprises the upper closure section 6, the upper baking mold part 2 and the upper hinge section 7. The lower tong part 8 is shown at the bottom in FIG. 1 and comprises the lower closure section 9, the lower baking mold part 3 and the lower hinge section 10. The two hinge sections 7 and 10 are provided on respective baking mold parts 2, 3 on one side thereof and together constitute a hinge 11, which connects the two tong parts 5 and 8 so that the latter are pivoted on the hinge pin 12. The two closure sections 6 and 9 are components which are secured to the two baking mold parts 2, 3 on that side which is opposite to the hinge 11 and constitute a closure 13 of the baking tongs 1. The lower closure section 9 is fixedly connected to a link plate 14 of a conveyor chain 17, which is provided with rollers 15 and rests on track rails 16. The upper closure section 6 carries a laterally attached guide roller 18 for engaging track rails, which are not shown and cause the tong parts 5, 8 to move apart and toward each other. A conveyor chain 19 is shown on the right in FIG. 1 and is parallel to the conveyor chain 17 that is shown on the left in FIG. 1. The conveyor chain 19 also comprises rollers 20, which rest on a track rail 21, and the lower hinge section 10 is secured to a link plate 22 fo the conveyor chain 19.

The closure of the baking tongs 1 comprises a cylindrical locking pin 23, which is immovably secured to the upper closure section 6 and protrudes from the inside surface 24 of the upper closure section 6 at right angles to the parting plane 4 of the wafer baking mold 2, 3. The locking pin 23 has a free end portion 25 that is formed with an annular groove 26. The closure also comprises a hook 28, which is pivotally movable on the outside surface 27 of the lower closure section about an axis 29 that is at right angles to the parting plane 4 between a release position (indicated by dotted lines in FIG. 2) and a locking position (indicated by solid lines in FIG. 2). The lower closure section 9 comprises a through opening 31, which extends from the inside surface 30 to the outside surface 27 of the lower closure section 9 and is adapted to receive the locking pin 23. The two positions of the hook 28 are defined by stops 32, 33. The hook 28 consists of a flat plate, which has a laterally open aperture 34 that constitutes the mouth of the hook and is adapted to interengage with the annular groove 26 of the locking pin 23. That side face of the annular groove which faces the inside surface 24 of the upper closure section 6 constitutes a rearwardly facing engaging surface 35 of the locking pin 23 for engagement with that portion of the rear surface of the hook 28 which surrounds the aperture 34. The hook 28 consists of a two-armed lever, which is formed in one arm with the unilaterally open aperture and on its other arm carries an actuating element that consists of a roller 36 for engaging tracks, not shown. The hook 28 has an inside surface which faces the outside surface 27 of the lower closure section 9 and constitutes an engaging surface 37, which is parallel to the parting plane 4 and is engageable with an engaging surface that is formed on the outside surface 27 of the lower closure section 9 and is also parallel to the parting plane 4. The latter engaging surface is constituted by the flat top surfaces of parallel ribs 38, 38', 38'', which protrude from the outside surface 27 of the lower closure section 9 and are preferably fixed by screws. Two of said ribs are close to the through aperture 31 (FIGS. 2, 4).

When wafer dough has been poured into the wafer baking mold 2, 3 of the baking tongs 1 and the heated baking tongs 1 are to be closed, the upper tong part 5 is pivotally moved by means of the guide roller 18 toward the lower tong part 8 until the locking pin 23 protrudes downwardly from the lower closure section 9 and the hook 28 can be pivotally moved to its locking position, wear being prevented owing to the slight clearance between the hook 28 and the ribs 38, 38', 38'' and between the hook 28 and the engaging surface 35 in the annular groove 26. The guide roller 18 is subsequently released so that the water vapor which is generated in the wafer baking mold 2, 3 as the wafers are baked therein tends to urge apart the two baking mold parts 2, 3 and also the two tong parts 5, 8 so that the clearance previously existing between the mutually associated engaging surfaces of the hook 28 and of the locking pin 23 and the clearance previously existing between the mutually associated engaging surfaces of the hook 28 and the ribs 38, 38', 38'' will be eliminated. When the baking tongs are at their operating temperature said clearances total about 0.1 to 1.0 mm, preferably 0.15 to 0.35 mm. As a result, the engaging surface 35 of the locking pin is now in snug contact with the outside surface of the hook 28 and the engaging surface 37 of the hook 28 is in snug contact with the top surface of the ribs 38, 38', 38''. During the pivotal movement of the hook 28 there is no frictional contact on the engaging surface 37, the engaging surface 35 or that portion of the inside surface of the hook which surrounds the aperture 34 and is engageable with the engaging surface 35. As a result, that pivotal movement of the hook will not wear said surfaces so that the engaging surfaces which contact each other when the hook is in locking position during the baking process will not be subjected to any wear which would influence the thickness of the baked wafers. On the other hand, the elimination of the clearances will ensure an unchanged geometry of the interlocked parts of the closure. As a result, any influence of the closure geometry on the thickness of the wafers will be effectively eliminated throughout the life of the wafer baking tongs.

FIG. 4 shows a different embodiment of a hook which may be used instead of the hook 28 in the baking tongs 1. That embodiment consists of a flat plate 40, which is pivoted on an axis 39 that is at right angles to the parting plane of the wafer baking mold. The plate 40 has a keyholelike opening 41, which extends along an arc of a circle and has a narrow portion 42 that constitutes a laterally open aperture for interengaging with the annular groove 26 of the locking pin 23. The wider portion 43 of the opening 41 constitutes a passage for the free end portion of the locking pin 23. That flat plate 40 also constitutes a two-armed lever, which is formed in one arm with the keyholelike opening 41 and on its other arm carries the roller 36.

FIG. 3 shows the closure region of a further embodiment of baking tongs 44 in accordance with the invention. The two tong parts 45, 46 constitute carrying frames 45, 46 and are movable toward and away from each other in substantially parallel directions, indicated by the arrows 47 and 48, along track rods which are secured in the carrying frames and are not shown. The baking tongs 44 are provided with a closure region on each of two mutually opposite sides. Only one of said closure regions will be described hereinafter. The closure region on the opposite side has a similar design but is a mirror image of the former and for this reason will not be described in detail.

The upper tong part 45 comprises an upper closure 49 and a cylindrical locking pin 50, which protrudes from the inside surface of the upper closure section at right angles to the parting plane 51 of the wafer baking mold 52, 53. The locking pin is formed in its free end portion with an annular groove 54. When the locking pin 50 extends through the lower closure section 55 in a through opening 58, which extends from the inside to the outside of the closure section 55, the annular groove 54 receives a laterally extending hook end portion 57 of a hook 56, which is pivoted to the lower closure section 55 of the lower tong part 46 on the outside of said closure section. The hook 56 is pivotally mounted by means of a pivot 59, which is rotatably mounted by bearing means, not shown, on the outside surface of the lower closure section 55 of the lower tong part 46, which constitutes a carrying frame. The hook 56 consists of a two-armed lever, one arm of which carries the laterally bent hook end portion 57 for interlocking with the locking pin 50 and the other arm of which carries a roller 60, which constitutes an actuating element.

For interengaging with the annular groove 54 of the locking pin 50, the laterally extending hook end portion 57 may be formed with a laterally open aperture 61 (FIG. 5) or with a keyholelike opening 62 (FIG. 6), which has a narrower portion 63, which constitutes the laterally open aperture for interengaging with the annular groove 54, whereas the wider portion 54 of the opening 62 constitutes a passage opening for the end portion of the locking pin 50. The laterally extending hook end portion 57 is concentrically curved. Beside the passage opening 58, the lower closure section 55 is formed on its outside surface with bearing ribs, which extend in the direction of the pivotal movement of the hook and cooperate with those surface portions of the laterally extending hook end portion which are disposed on both sides of the aperture 61 or of the keyholelike opening 62.

The engaging surfaces 65, 66 which are respectively formed on the top of the engaging ribs and on the laterally extending end portion 57 of the hook 56 and are associated and engageable with each other consist of circular cylindrical surfaces which are coaxial with the pivotal axis 59 which constitutes the axis of the cylinder.

The embodiments which have been described by way of example constitute baking tongs in which the baking mold parts are integrated. It will be understood that the invention is applicable also to baking tongs having tong parts which constitute carrying frames in which the parts of a baking mold can be received which defines a parting plane and can be opened and closed by movements relative to said parting plane. Such baking mold plates may consist of flat baking plates or of a die and punch of a mold for baking cones or the like.

It will also be understood that the closures which have been described are not restricted to the respective illustrative embodiment of the wafer baking tongs and that they can be exchanged for each other as desired.

We claim:

1. Wafer baking tongs for producing edible wafers of three-dimensional shape by baking wafer dough, comprising
   (a) a wafer baking mold which comprises baking mold parts on opposite sides of a parting plane and having confronting inside surfaces, the baking mold parts being movable towards and away from each other to close and open the baking mold, and the inside baking mold part surfaces forming baking surfaces defining the three-dimensional shape of the baked wafers when the baking mold is closed,
   (b) two baking tong parts on opposite sides of the parting plane and holding the baking mold parts, the baking tong parts being movable towards and away from the parting plane to close and open the baking mold, and the baking tong parts having
      (1) cooperating closure sections having confronting inside surfaces on opposite sides of the parting plane and outside surfaces, the closure sections being arranged laterally adjacent the baking mold parts for rigidly interlocking the tong parts after they have been moved towards each other to close the baking mold,
   (c) rollers engaging the two baking tong parts for moving the baking tong parts towards and away from each other, and
   (d) an arrangement for rigidly interlocking the two tong parts and comprising two locking parts engageable with each other to interlock the two tong parts rigidly and an actuating element arranged to cause the locking parts to engage with each other after the two tong parts have moved towards each other,
      (1) one of the locking parts being a locking pin rigidly secured to one of the closure sections and protruding substantially perpendicularly to the parting plane from the inside surface of the one closure section through a through opening in the closure section cooperating with the one closure section when the two tong parts have moved towards each other to close the baking mold,
      (2) the other locking part being a hook disposed on the outside surface of the cooperating closure section and pivotally movable between a locking position for engaging the locking pin and a release position, the hook carrying the actuating element and being engageable with the rigidly secured locking pin only after the two tong parts have been moved towards each other to close the baking mold, and
      (3) the hook and the outside surface of the cooperating closure section having cooperating surfaces engaging each other in the locking position as the two tong parts move apart during baking of the wafer dough in the baking mold.

2. Wafer baking tongs according to claim 1, further comprising hinge means connecting the two tong parts at a side of the baking mold opposite the closure sections, and the actuating element pivoting the hook into the locking position after the two tong parts have been moved towards each other to close the baking mold.

3. Wafer baking tongs according to claim 2, wherein the pivotal axis of said hook is at right angles to the parting plane of the wafer baking mold.

4. Wafer baking tongs according to claim 3, wherein said hook constitutes a two-armed lever, one arm of which is engageable with the locking pin and the other arm of which carries said actuating element.

5. Wafer baking tongs according to claim 4, wherein said actuating element consists of a roller.

6. Wafer baking tongs according to claim 3, wherein said hook consists of a flat plate, which is provided with a laterally open aperture for receiving said locking pin, and said locking pin comprises a free end portion, which has a rearwardly facing engaging surface for engaging that portion of the rear surface of the flat plate which surrounds said aperture.

7. Wafer baking tongs according to claim 6, wherein said flat plate has a keyholelike opening, which has a narrow portion, which constitutes said laterally open aperture for receiving the locking pin.

8. Wafer baking tongs according to claim 7, wherein the inside width of said laterally open aperture is smaller than the outside diameter of the locking pin, which is cylindrical, the locking pin is formed in its free end portion with a radial groove, the diameter of the pin at the bottom of said groove corresponds to the inside width of said aperture, and the profile fo said groove corresponds to the profile of the edge which defines said aperture.

9. Wafer baking tongs according to claim 6, wherein the inside width of said laterally open aperture is smaller than the outside diameter of the locking pin, which is cylindrical, the locking pin is formed in its free end portion with a radial groove, the diameter of the pin at the bottom of said groove corresponds to the inside width of said aperture, and the profile of said groove corresponds to the profile of the edge which defines said aperture.

10. Wafer baking tongs according to claim 7, wherein the pivotal axis of said hook is parallel to the parting plane of the wafer baking mold.

11. Wafer baking tongs according to claim 10, wherein said hook constitutes a two-armed lever, one arm of which is engageable with the locking pin and the other arm of which carries said actuating element.

12. Wafer baking tongs according to claim 11, wherein said actuating element consists of a roller.

13. Wafer baking tongs according to claim 10, wherein said hook has a laterally extending hook end portion formed with a laterally open aperture for receiving the locking pin and the locking pin has a free end portion formed with a rearwardly facing engaging surface for engaging that portion of the rear surface of said laterally extending hook end portion which surrounds said aperture.

14. Wafer baking tongs according to claim 13, wherein the inside width of said laterally open aperture is smaller than the outside diameter of the locking pin, which is cylindrical, the locking pin is formed in its free end portion with a radial groove, the diameter of the pin at the bottom of said groove corresponds to the inside width of said aperture, and the profile of said groove corresponds to the profile of the edge which defines said aperture.

15. Wafer baking tongs according to claim 10, wherein said hook comprises a laterally extending hook end portion that is formed with a keyholelike opening, which has a narrower portion that constitutes said laterally open aperture for receiving said locking pin.

16. Wafer baking tongs according to claim 15, whrein the inside width of said laterally open aperture is smaller than the outside diameter of the locking pin, which is cylindrical, the locking pin is formed in its free end portion with a radial groove, the diameter of the pin at the bottom of said groove corresponds to the inside width of said aperture, and the profile of said groove corresponds to the profile of the edge which defines said aperture.

17. Wafer baking tongs according to claim 1, wherein each tong part has a respective one of the laterally arranged closure sections on each side of th baking mold, the closure sections forming pairs of cooperating closure sections, respective ones of the locking pins being rigidly secured to the closure sections of one tong part and protruding substantially perpendicularly to the parting plane from the inside surfaces of the closure sections of the one tong part through respective through openings in the closure sections cooperating with the closure sections of the one tong part when the two tong parts have moved towards each other to close the baking mold, and respective ones of the hooks disposed on the outside surfaces of the cooperating closure sections, each of the hooks carrying a respective one of the actuating elements, and the hooks and the outside surfaces of the cooperating closure sections having cooperating surfaces engaging each other in the locking position as the two tong parts move apart during baking of the wafer dough in the baking mold.

18. Wafer baking tongs according to claim 7, wherein th pivotal axis of said hook is at right angles to the parting plane of the wafer baking mold.

19. Wafer baking tongs according to claim 18, wherein each of said hooks constitutes a two-armed lever, one arm of which is engageable with the associated locking pin and the other arm of which carries the associated locking pin and the other arm of which carries the associated actuating element.

20. Wafer baking tongs according to claim 19, wherein each of said actuating elements consists of a roller.

21. Wafer baking tongs according to claim 18, wherein each of said hooks consists of a flat plate, which is provided with a laterally open aperture for receiving the associated locking pin, and each of said locking pins comprises a free end portion, which has a rearwardly facing engaging surface for engaging that portion of the rear surface of the associated flat plate which surrounds said aperture.

22. Wafer baking tongs according to claim 21, wherein the inside surfac of each said laterally open apertures is smaller than the outside diameter of the associated cylindrical locking pin, each of said locking pins is formed in its free end portion with a radial groove, the diameter of each of said pins at the bottom of said groove corresponds to the inside width of the associated aperture, and the profile of each of said grooves corresponds to the profile of the edge which defines the associated aperture.

23. Wafer baking tongs according to claim 21, wherein each of said flat plates has a keyholelike opening, which has a narrow portion, which constitutes said laterally open aperture for receiving the associated locking pin.

24. Wafer baking tongs according to claim 23, wherein the inside width of each of said laterally open apertures is smaller than the outside diameter of the associated cylindrical locking pin, each of said locking pins is formed in its free end portion with a radial groove, the diameter of each of said pins at the bottom of said groove corresponds to the inside width of the associated aperture, and the profile of each of said grooves corresponds to the profile of the edge which defines the associated aperture.

25. Wafer baking tongs according to claim 17, wherein the pivotal axis of said hook is parallel to the parting plane of th wafer baking mold.

26. Wafer baking tongs according to claim 25, wherein each of said hooks has a laterally extending hook end portion formed with a laterally open aperture for receiving the associated locking pin and each of said locking pins has a free end portion formed with a rearwardly facing engaging surface for engaging that portion of the rear surface of said laterally extending hook end portion which surrounds said aperture.

27. Wafer baking tongs according to claim 26, wherein the inside width of each of said laterally open apertures is smaller than the outside diameter of the associated locking pin, which is cylindrical, each of said locking pins is formed in its free end porion with a radial groove, the diameter of the pin at the bottom of said groove corresponds to the inside width of the associated aperture, and the profile of said groove corresponds to the profile of the edge which defines the associated aperture.

28. Wafer baking tongs according to claim 25, wherein each of said hooks comprises a laterally extending hood end portion that is formed with a keyholelike opening, which has a narrower portion that constitutes said laterally open aperture for receiving the associated locking pin.

29. Wafer baking tongs according to claim 28, wherein the inside width of each of said laterally open apertures is smaller than the outside diameter of the associated locking pin, which is cylindrical, each of said locking pins is formed in its free end portion with a radial groove, the diameter of the pin at the bottom of said groove corresponds to the inside width of the associated aperture, and the profile of said groove corresponds to the profile of the edge which defines the associated aperture.

30. Wafer baking tongs according to claim 25, wherein each of said hooks constitutes a two-armed lever, one arm of which is engageable with the locking pin and the other arm of which carries said actuating element.

31. Wafer baking tongs according to claim 30, wherein said actuating element consists of a roller.

* * * * *